(12) United States Patent
Miller

(10) Patent No.: US 10,728,815 B2
(45) Date of Patent: Jul. 28, 2020

(54) SIDEHAUL MINIMIZATION BY DROPPING AND RECONNECTING A MOBILE DEVICE THAT HAS HANDED OFF

(71) Applicant: MOTOROLA SOLUTIONS, INC, Chicago, IL (US)

(72) Inventor: Trent J. Miller, West Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/716,805

(22) Filed: Sep. 27, 2017

(65) Prior Publication Data
US 2019/0098548 A1    Mar. 28, 2019

(51) Int. Cl.
| | |
|---|---|
| H04W 36/14 | (2009.01) |
| H04W 36/36 | (2009.01) |
| H04L 29/08 | (2006.01) |
| H04W 4/40 | (2018.01) |
| H04W 36/00 | (2009.01) |
| H04W 60/06 | (2009.01) |
| H04W 88/14 | (2009.01) |
| H04W 84/18 | (2009.01) |

(52) U.S. Cl.
CPC ............. *H04W 36/14* (2013.01); *H04L 67/14* (2013.01); *H04L 67/148* (2013.01); *H04W 4/40* (2018.02); *H04W 36/03* (2018.08); *H04W 36/36* (2013.01); *H04W 60/06* (2013.01); *H04W 84/18* (2013.01); *H04W 88/14* (2013.01)

(58) Field of Classification Search
CPC ....... H04W 36/14; H04W 92/02; H04B 17/00
See application file for complete search history.

(56) References Cited

U.S. PATENT DOCUMENTS

| | | | |
|---|---|---|---|
| 9,479,984 B2 | 10/2016 | Olofsson et al. | |
| 2012/0252509 A1* | 10/2012 | Wen ..................... | H04B 7/2606 |
| 2014/0119175 A1* | 5/2014 | Velde .................... | H04W 76/19 |
| | | | 370/225 |
| 2014/0233412 A1* | 8/2014 | Mishra .................. | H04W 76/10 |
| | | | 370/252 |
| 2015/0319664 A1* | 11/2015 | Perras ................... | H04W 36/22 |
| | | | 370/331 |

FOREIGN PATENT DOCUMENTS

WO    2016107887 A1    7/2016

* cited by examiner

*Primary Examiner* — Myron Wyche

(57) ABSTRACT

A method is provided that facilitates sidehaul minimization by dropping and reconnecting a mobile device when the mobile device has handed off to a second deployable in a deployable ad hoc communication system. A data session is established for the mobile device utilizing resources in the first deployable. At some point the mobile device hands over to a second deployable in the multiple deployable ad hoc network. The data session at the first deployable remains active and continues to send and receive bearer traffic and control traffic for the mobile device. Upon determining that the mobile device has entered an idle state, the mobile device is dropped from the second deployable and reconnects back to the second deployable. By dropping and reconnecting, the data and bearer sessions are moved from the first deployable to the second deployable, thereby eliminating sidehaul between the first deployable and the second deployable.

16 Claims, 3 Drawing Sheets

SIDEHAUL MINIMIZATION BY DROPPING AND RECONNECTING A MOBILE DEVICE THAT HAS HANDED OFF

BACKGROUND OF THE INVENTION

Multiple deployables (vehicles, backpacks, drones, balloons, etc.) can arrive at an incident scene and form an interoperable ad hoc deployable network. In these ad hoc deployable networks, each deployable can function independently and has its own base station, Core Network, and applications. For example, each new vehicle that joins the vehicle deployable ad hoc network becomes an additional piece, or shard, of a single LTE system. When 'shards' come together, they enlarge coverage and preferably begin to automatically interoperate.

A mobile device can seamlessly handover from one vehicle to the next and all active bearer and control sessions will continue. The routing of active bearer and control sessions from the second vehicle's base station to the first vehicle's Core Network is facilitated by sidehaul, which is an RF link that interconnects adjacent vehicles. Deployables may be repositioned during an incident or may leave the incident altogether, which results in the loss of sidehaul to the deployable. Sidehaul is fragile and not reliable, and therefore undesirable, particularly in emergency situations where ad hoc networks are typically used.

Therefore a need exists for a way of handing over a mobile device within a vehicular ad hoc communication network while minimizing the use of sidehaul between adjacent vehicles.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
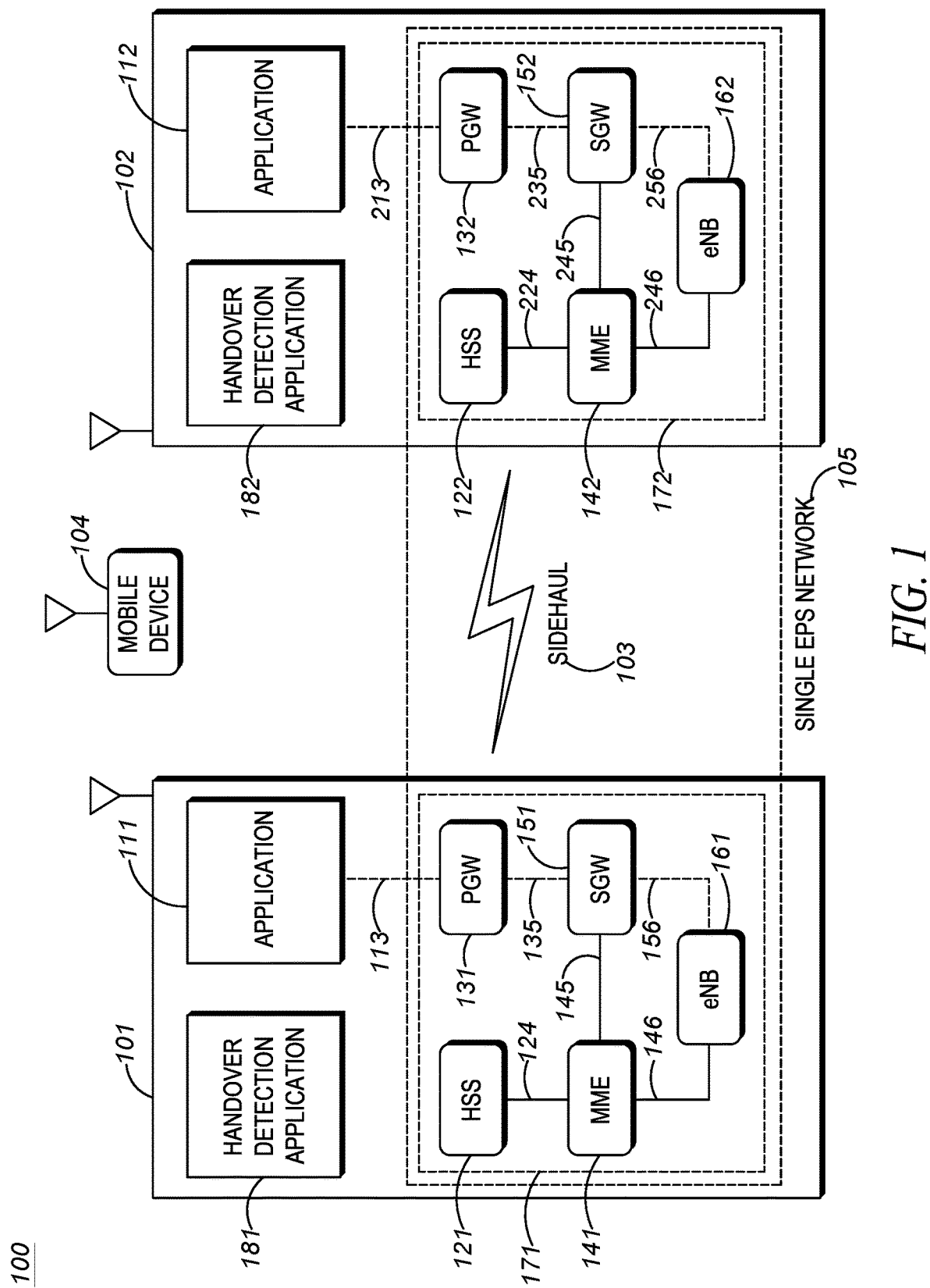
FIG. 1 depicts a system diagram of a multiple deployable ad hoc network in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a multiple deployable ad hoc network 100 in accordance with an exemplary embodiment of the present invention. Multiple deployable ad hoc network 100 preferably comprises deployable 101, deployable 102, sidehaul 103, and mobile device 104. It should be understood that multiple deployable ad hoc network 100 can include a plurality of mobile devices, but only one, mobile device 104, is depicted in FIG. 1 for clarity. In the exemplary embodiment depicted in FIG. 1, deployable ad hoc network 100 comprises two deployables, deployable 101 and deployable 102. It should be understood that vehicle ad hoc network 100 could include several additional vehicles, but only two are depicted in FIG. 1 for clarity.

Deployable 101 comprises Application 111, Handover Detection Application 181, and EPS (Evolved Packet System) Network 171. EPS Network 171 comprises HSS (Home Subscriber Server) 121, PGW (Packet Data Network Gateway) 131, MME (Mobility Management Entity) 141, SGW (Serving Gateway) 151, and eNB 161.

Application 111 is software that performs predetermined functions for mobile device 104 and optionally EPS 171. For example, mobile device 104 might be a push-to-talk server, an IMS server, a VoLTE server, a video streaming server, a situational awareness server, a video server, a machine-to-machine (M2M) server, or an Internet of Things (IoT) server.

Handover Detection Application 181 is software that detects when a mobile device has handed over from one EPS to another EPS within vehicle ad hoc network 100. Although pictured as an application in FIG. 1, the functionality of Handover Detection Application 181 could be embodied within a processor within EPS Network 171.

HSS 121 is a central database that includes user-related and subscription-related information, such as subscriber profiles. HSS 121 supports mobility management and is used during the process of device authentication. In the exemplary embodiment depicted in FIG. 1, mobile device 104 is provisioned in both HSS 121 and HSS 122.

PGW 131 provides connectivity from mobile device 104 to external packet data networks by being the point of exit and entry of Application 111 traffic for mobile device 104. PGW 131 preferably performs quality of service (QoS) policy enforcement, packet filtering, charging support, lawful interception and packet screening. PGW 131 also preferably acts as the anchor for mobility between 3GPP and non-3GPP technologies such as WiMAX and 3GPP2 (CDMA 1× and EvDO).

MME 141 is preferably responsible for mobility management, including idle mode mobile device paging and tagging procedure including retransmissions. MME 141 is preferably involved in the bearer activation and deactivation process and is also responsible for choosing the SGW for a mobile device at the initial attach and at time of intra-LTE handover involving Core Network node relocation. MME 141 also is preferably responsible for working with HSS 121 in the authentication of Mobile Device 104. MME 141 also terminates the S6a interface towards the home HSS for roaming mobile devices.

SGW 151 routes and forwards user data packets from e mobile device 104 to the PGW 141. SGW 151 acts as the mobility anchor for the user plane during inter-eNodeB handovers and as the anchor for mobility between LTE and other 3GPP technologies.

eNB 161 is the hardware that communicates directly over a Tireless link with mobile devices, such as mobile device 104. eNB 161 is similar to a base transceiver station (BTS) in GSM networks.

Each of the elements within deployable 101 are coupled via connections and utilize different protocols to send and receive information therebetween. In accordance with an exemplary embodiment, Application 111 is coupled to PGW 131 via link 113, which preferably utilizes an SGi interface. HSS 121 is coupled to MME 141 via interface 124, which is preferably an S6a interface. PGW 131 is coupled to SGW 151 via interface 135, which is preferably an S5 interface. MIME 141 is coupled with SGW 151 via interface 145, which is preferably an S11 interface. MME 141 is coupled with eNB 161 via interface 146, which is preferably an S1-MME interface. SGW 151 is coupled with eNB 161 via interface 156, which is preferably an S1-U interface.

Similarly, each of the elements within deployable 102 are coupled via connections and utilize different protocols to send and receive information therebetween. In accordance with an exemplary embodiment, Application 112 is coupled to PGW 131 via link 213, which preferably utilizes an SGi interface. HSS 122 is coupled to MME 142 via interface 224, which is preferably an S6a interface. PGW 132 is coupled to SGW 152 via interface 235, which is preferably an S5 interface. MME 142 is coupled with SGW 152 via interface 245, which is preferably an S11 interface. MME 142 is coupled with eNB 162 via interface 246, which is preferably an S1-MME interface. SGW 152 is coupled with eNB 162 via interface 256, which is preferably an S1-U interface.

Deployable 102 is similar to deployable 101 and comprises Application 112, Handover Detection Application 182, and EPS Network 172. EPS Network 172 comprises HSS 122, PGW 132, MME 142, SGW 152, and eNB 162, which are substantially similar to corresponding elements in deployable 101 and perform the same functions.

Sidehaul 103 is an RF link that interconnects deployables in multiple deployable ad hoc network 100. In an exemplary embodiment, sidehaul between two vehicles is automatically established when the two vehicles are in range of one another. Sidehaul 103 preferably uses in-band LTE spectrum, but can alternately use out-of-band technologies as well. Sidehaul preferably carries inter-EPS traffic such as S6a, S5, S10, and X2 traffic, and also application traffic.

Mobile device 104 is a portable electronic communication device that can be used for sending voice or data to other communication units.

Single EPS Network 105 comprises EPS 171 and EPS 172 and forms a single LTE network. It should be understood that Single EPS Network 105 can comprise additional EPS networks, but only two, EPS 171 and EPS 172 are depicted in FIG. 1 for clarity.

Figure 2:
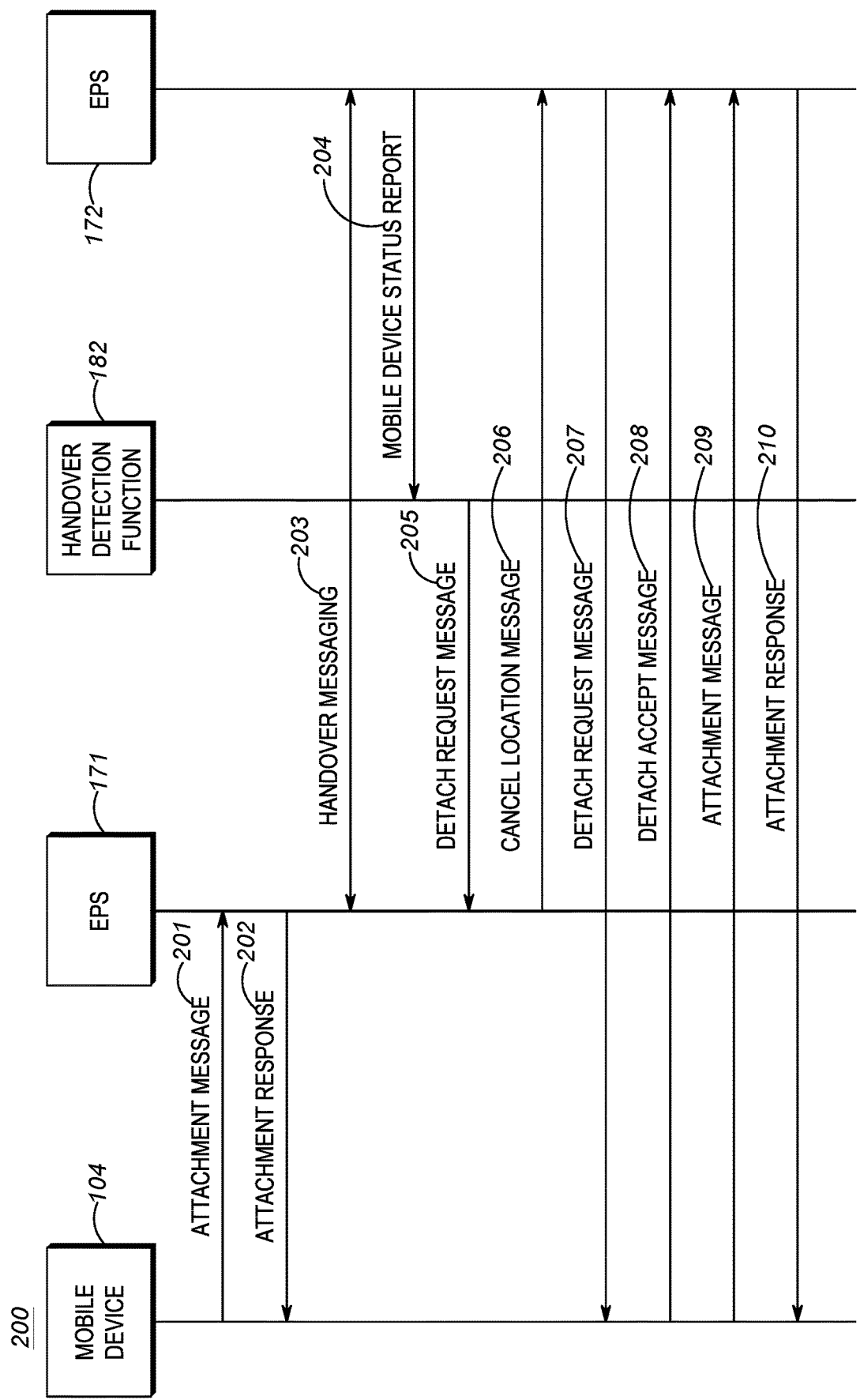
FIG. 2 depicts an infrastructure-controlled call flow diagram in accordance with an exemplary embodiment of the present invention.

FIG. 2 depicts an infrastructure-controlled call flow diagram 200 in accordance with an exemplary embodiment of the present invention. In this exemplary embodiment, Handover Detection Function 182 determines when mobile device 104 should drop and reconnect with EPS 172.

Mobile Device 104 sends Attachment Message 201 to EPS 171 within deployable 101. Attachment Message 201 is generated by Mobile Device 104 upon arriving at the incident scene and desiring to connect to multiple deployable ad hoc network 100. As used herein, the word "connect" can mean mobile device 104 attaches to an EPS, or establishes communication with an EPS.

EPS 171 sends Attachment Response 202 to Mobile Device 104 once Mobile Device 104 is successfully attached and registered at deployable 101 within multiple deployable ad hoc network 100.

In accordance with an exemplary embodiment, at some point Mobile Device 104 establishes a data session utilizing EPS 171. As used herein, the term 'data session' means at least one bearer, preferably the default bearer, is active in an EPS for mobile device 104. EPS 171 preferably establishes the data session between Mobile Device 104 and Application 111.

Initially, during the session between mobile device 104 and application 111, bearer data flows from mobile device 104 to application 111 via eNB 161, MME 141, and HSS 121. Bearer data between application 111 and mobile device 104 flows from application 111 to mobile device 104 via HSS 121, MME 141, and eNB 161. Control data flows from mobile device 104 to application 111 via eNB 161, SGW 151, and PGW 131. Control data flows from application 111 to mobile device 104 via PGW 131, SGW 151, and eNB 161.

In accordance with an exemplary embodiment, at some point mobile device 104 is in a position where the RF signal from deployable 102 is better than the RF signal from the current serving vehicle, deployable 101. In this exemplary embodiment, mobile device 104 performs a handover to deployable 102 utilizing Handover Messaging 203 between mobile device 104 and EPS 172.

In current multiple deployable ad hoc networks, since mobile device 104 registered with EPS 171 at deployable 101, mobile device 104 still utilizes HSS 121 and PGW 131, even though mobile device 104 has handed over to EPS 172 at deployable 102. Control data and bearer data are routed from EPS 172 in deployable 102 to EPS 171 in deployable 101 utilizing sidehaul 103. Therefore in current systems all user traffic, both bearer and control, must be sent and received to and from EPS 171 via sidehaul 103. Not only is this inefficient, but is also unreliable, as sidehaul 103 is subject to lost data due to low non-directional antennas, building interference, terrain interference, and foliage.

In accordance with an exemplary embodiment of the present application, a novel handover detection function is located within each EPS, Handover Detection Application 181 in EPS 171 and Handover Detection Application 182 in EPS 172.

In accordance with an exemplary embodiment, EPS 172 detects that mobile device 104 has handed over from EPS 171 in deployable 101 to EPS 172 in deployable 102. Responsive to this, EPS 172 sends Mobile Device Status Report 204 to Handover Detection Application 182. In accordance with an alternate exemplary embodiment, EPS 171 detects that mobile device 104 has handed over from EPS 171 in deployable 101 to EPS 172 in deployable 102 and sends a Mobile Device Status Report message to Handover Detection Application 181 located within deployable 101. Mobile Device Status Report 204 preferably includes the current serving cell, attached PLMN (Public Land Mobile Network identifier), attached APNs (Access Point Names) and associated IP addresses, a list of active bearers, a list of active application sessions, and a packets per second field for each active session.

At this point, EPS 172 knows that mobile device 104 has been handed over but is still utilizing sidehaul 103 to send bearer and control data to EPS 171. This is suboptimal and EPS 172 would like to transition all bearer and control traffic from EPS 171 to EPS 172. However, this needs to be done in a way that is least disruptive to mobile device 104.

In accordance with an exemplary embodiment, Handover Detection Application 182 monitors the state of mobile device 104 and upon mobile device 104 entering an idle state, Handover Detection Application 182 sends Detach Request Message 205 to EPS 171. In one exemplary embodiment, "idle state" is defined as a packets per second rate below a pre-determined threshold for a period of time. In another exemplary embodiment, "idle state" is defined as all bearers except each APN's default bearer have been deactivated. In yet another exemplary embodiment, "idle state" is the packet rate for all GBR (Guaranteed Bit Rate) bearers being below a pre-determined threshold. In another exemplary embodiment, "idle state" means only applications of a specific type, for example a web browser, are in use, and other applications like voice and video communications are not in use. The Detach Request Message is intended to trigger having mobile device 104 drop from EPS 171 and reconnect to EPS 172. This in turn will ensure that all traffic to and from mobile device 104 is routed through EPS 172 without routing any of the bearer or control traffic to EPS 171 utilizing sidehaul 103.

EPS 171 preferably sends Cancel Location Message 206 to EPS 172. Cancel Location Message 206 instructs EPS 172 to initiate the drop and reconnect process.

Handover Detection Application 182 preferably makes the determination that mobile device 104 is idle. After determining that mobile device 104 is idle, which preferably occurs upon reception of Cancel Location Message 206, EPS 172 sends Detach Request Message 207 to mobile device 104. Detach Request Message 207 is a message requesting mobile device 104 to drop and reconnect to multiple deployable ad hoc network 100 at EPS 172. In another exemplary embodiment, the Detach Request Message 207 requests mobile device 104 to detach from EPS 172. Mobile device 104 then performs standard reselection procedures to select EPS 172 for attachment. EPS 172 can use various methods to determine that mobile device 104 is idle. In a first exemplary embodiment, EPS 172 determines that mobile device 104 is idle when only the default bearers, typically one per attached APN, are active for mobile device 104. Alternately, EPS 172 determines that mobile device 104 is idle when the number of dedicated bearers for mobile device 104 is below a threshold. In a further exemplary embodiment, EPS 172 determines that mobile device 104 is idle when the number of IMS or application sessions is below a threshold, such as 0. In a further exemplary embodiment, EPS 172 determines that mobile device 104 is idle when predetermined applications are not in use, for example PTT or streaming video applications. In a further exemplary embodiment, EPS 172 determines that mobile device 104 is idle when only Internet traffic is in use. In a further exemplary embodiment, EPS 172 determines that mobile device 104 is idle when only specific APN(s) are in use. In a further exemplary embodiment, EPS 172 determines that mobile device 104 is idle when the packets-per-second rate for mobile device 104 applications is below a predetermined threshold, such as 0. In a further exemplary embodiment, EPS 172 determines that mobile device 104 is idle when EPS 172 receives a predetermined signal from mobile device 104. In a further exemplary embodiment, EPS 172 determines that mobile device 104 is idle when EPS 172 receives a signal from another user, such as an incident commander or communications unit leader (COML). In a further exemplary embodiment, EPS 172 determines that mobile device 104 is idle when EPS 172 receives a signal from a mobile device application, such as a coverage analysis app. In a further exemplary embodiment, EPS 172 determines that mobile device 104 is idle when receiving a signal from an infrastructure application, such as a Computer Aided Dispatch system or Incident Command application.

In a further exemplary embodiment, EPS 172 determines that mobile device 104 is idle when a packets per second rate below a pre-determined threshold for a period of time. In another exemplary embodiment, EPS 172 determines that mobile device 104 is idle when all bearers except each APN's default bearer have been deactivated. In yet another exemplary embodiment, EPS 172 determines that mobile device 104 is idle when the packet rate for all GBR bearers being below a pre-determined threshold. In another exemplary embodiment, EPS 172 determines that mobile device 104 is idle when only applications of a specific type, for example a web browser, are in use, and other applications like voice and video communications are not in use.

It should be understood that requesting mobile device 104 to drop and reconnect to EPS 172 is not the same as handing over mobile device 104. Handover is generally understood as the process of a mobile device or infrastructure determining when the mobile device should change cells for better RF conditions. Handover does not result in a change of HSS, whereas dropping and reconnecting will move the serving HSS from HSS 121 to HSS 122 at the new cell site. In addition, handover does not result in a mobile device losing, temporarily, RF communications with the communication system, whereas drop and reconnect does have the mobile device lose communication with the communication system temporarily.

Mobile Device 104 sends Detach Accept Message 208 to EPS 172. Detach Accept Message 208 is an acknowledgment message sent to indicate that mobile device has received the instruction and will commence the detachment process in response to Detach Request Message 207. At this point, mobile device 104 drops from EPS 172.

Mobile device 104 sends Attachment Message 209 to EPS 172. Attachment Message 209 is a request from mobile device 104 to attach to communication system 100, specifically to connect with EPS 172. By connecting with EPS 172, EPS 172 will become the home vehicle for mobile device 104, which means that HSS 122 is the home HSS for mobile device 104, and that all traffic will be routed to applications via network infrastructure located within EPS 172.

EPS 172 sends Attachment Response 210 to mobile device 104, which preferably confirms that the reattachment was successful and that mobile device 104 is now registered with EPS 172. Because of this, sidehaul 103 is no longer used to carry bearer or control traffic, and communications to and from mobile device 104 are more secure than prior to reattachment, when sidehaul 103 was used to carry data for mobile device 104.

Figure 3:
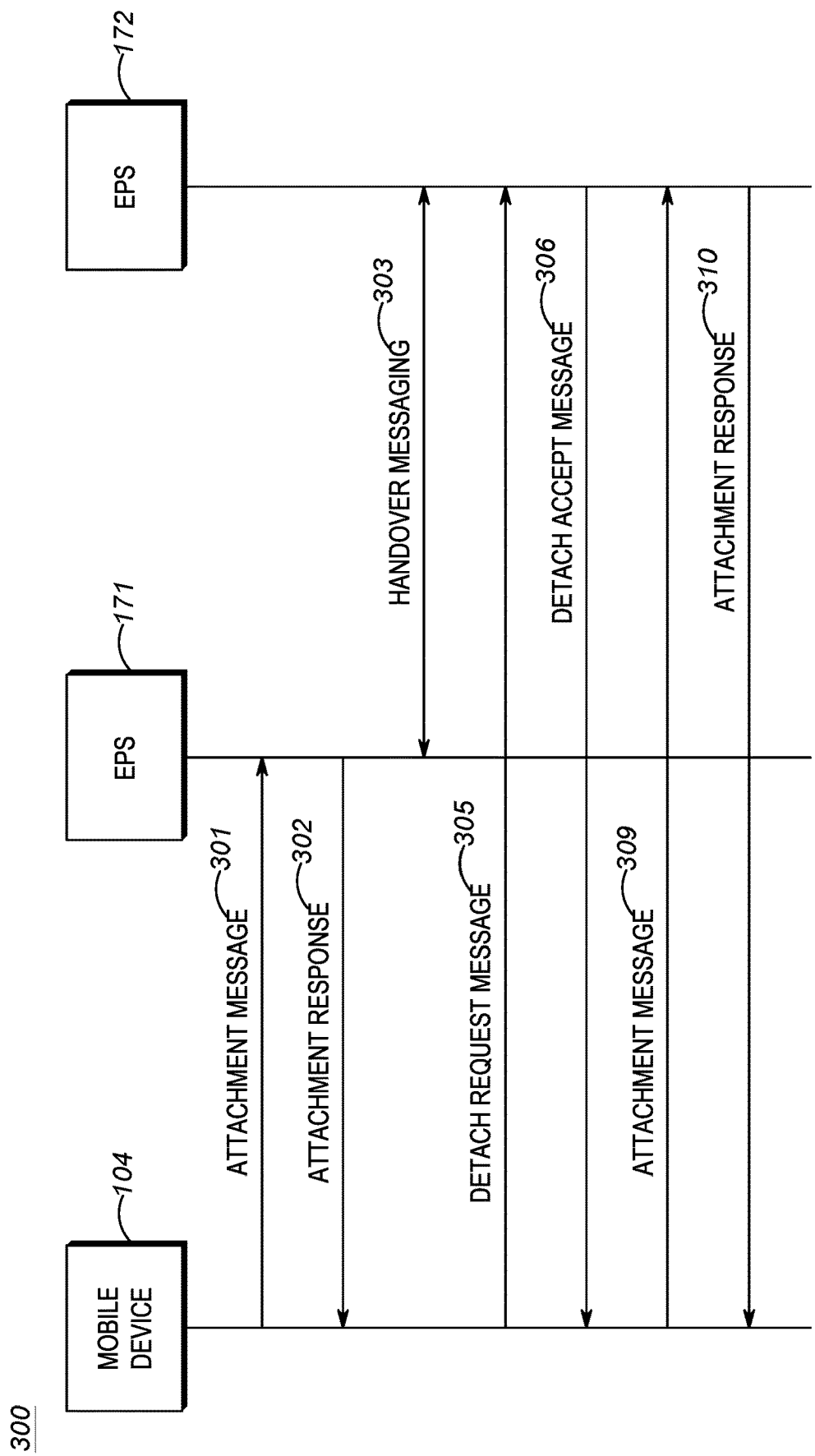
FIG. 3 depicts a mobile device-controlled call flow diagram in accordance with an exemplary embodiment of the present invention.

FIG. 3 depicts a mobile device-controlled call flow diagram 300 in accordance with an exemplary embodiment of the present invention. In this exemplary embodiment, the mobile device makes the determination on when to drop and reconnect to the new EPS in order to avoid having data sent over sidehaul to the old EPS.

Mobile Device 104 sends Attachment Message 301 to EPS 171 within deployable 101. Attachment Message 301 is generated by Mobile Device 104 upon arriving at the incident scene and desiring to connect to multiple deployable ad hoc network 100.

EPS 171 sends Attachment Response 302 to Mobile Device 104 once Mobile Device 104 is successfully attached and registered at deployable 101 within multiple deployable ad hoc network 100.

In accordance with an exemplary embodiment, at some point Mobile Device 104 establishes a data session utilizing EPS 171. EPS 171 preferably establishes the data session between Mobile Device 104 and Application 111.

Initially, during the session between mobile device 104 and application 111, bearer data flows from mobile device 104 to application 111 via eNB 161, SGW 151, and PGW 131. Bearer data between application 111 and mobile device 104 flows from application 111 to mobile device 104 via PGW 131, SGW 151, and eNB 161. LTE control signaling flows from mobile device 104 to HSS 121 via eNB 161, and MME 141. Control data flows from HSS 121 to mobile device 104 via MME 141 and eNB 161.

In accordance with an exemplary embodiment, at some point mobile device 104 is in a position where the RF signal from deployable 102 is better than the RF signal from the current serving vehicle, deployable 101. In this exemplary embodiment, mobile device 104 performs a handover to deployable 102 utilizing Handover Messaging 303 between mobile device 104 and EPS 172.

In current multiple deployable ad hoc networks, since mobile device 104 registered with EPS 171 at deployable 101, mobile device 104 still utilizes HSS 121 and PGW 131, even though mobile device 104 has handed over to EPS 172 at deployable 102. Control data and bearer data are routed from EPS 172 in deployable 102 to EPS 171 in deployable 101 utilizing sidehaul 103. Therefore in current systems all user traffic, both bearer and control, must be sent and received to and from EPS 171 via sidehaul 103. Not only is this inefficient, but is also unreliable, as sidehaul 103 is subject to lost data due to low non-directional antennas, building interference, terrain interference, and foliage.

In accordance with an exemplary embodiment of the present application, a novel handover detection function is located within mobile device 104. The handover detection function detects that mobile device 104 has handed over from EPS 171 in deployable 101 to EPS 172 in deployable 102 and therefore a drop and reconnect would establish a new session where sidehaul 103 is not used to convey bearer or data traffic.

In accordance with an exemplary embodiment, the Handover Detection Application within mobile device 104 monitors the state of mobile device 104 and upon mobile device 104 entering an idle state, the Handover Detection Application sends Detach Request Message 305 to EPS 172. This message is intended to trigger having mobile device 104 stop using HSS 121 and, upon reattachment, start using HSS 122. This in turn will ensure that all traffic to and from mobile device 104 is routed through EPS 172 without routing any of the bearer or control traffic to EPS 171 utilizing sidehaul 103.

After determining that mobile device 104 is idle, mobile device 104 sends Detach Request Message 305 to EPS 172. Detach Request Message 305 is a message alerting EPS 172 that mobile device 104 is going to drop and reconnect to multiple deployable ad hoc network 100 at EPS 172. Mobile device 104 can use various methods to determine that mobile device 104 is idle. In a first exemplary embodiment, mobile device 104 determines that mobile device 104 is idle when only the default bearer is active for mobile device 104. Alternately, mobile device 104 determines that mobile device 104 is idle when the number of dedicated bearers for mobile device 104 is below a threshold. In a further exemplary embodiment, mobile device 104 determines that mobile device 104 is idle when the number of IMS or application sessions is below a threshold, such as 0. In a further exemplary embodiment, mobile device 104 determines that mobile device 104 is idle when predetermined applications are not in use, for example PTT or streaming video applications. In a further exemplary embodiment, mobile device 104 determines that mobile device 104 is idle when only Internet traffic is in use. In a further exemplary embodiment, mobile device 104 determines that mobile device 104 is idle when only specific APN(s) are in use. In a further exemplary embodiment, EPS 172 determines that mobile device 104 is idle when the packets-per-second rate for mobile device 104 applications is below a predetermined threshold, such as 0. In a further exemplary embodiment, mobile device 104 determines that mobile device 104 is idle when EPS 172 receives a predetermined signal from mobile device 104. In a further exemplary embodiment, mobile device 104 determines that mobile device 104 is idle when mobile device 104 receives a signal from a mobile device application, such as a coverage analysis app. In a further exemplary embodiment, mobile device 104 determines that mobile device 104 is idle when receiving a signal from an infrastructure application, such as a Computer Aided Dispatch system or Incident Command application.

In a further exemplary embodiment, EPS 172 determines that mobile device 104 is idle when a packets per second rate below a pre-determined threshold for a period of time. In another exemplary embodiment, EPS 172 determines that mobile device 104 is idle when all bearers except each APN's default bearer have been deactivated. In yet another exemplary embodiment, EPS 172 determines that mobile device 104 is idle when the packet rate for all GBR bearers being below a pre-determined threshold. In another exemplary embodiment, EPS 172 determines that mobile device 104 is idle when only applications of a specific type, for example a web browser, are in use, and other applications like voice and video communications are not in use.

EPS 172 sends Detach Accept Message 306 to mobile device 104. Detach Accept Message 306 is an acknowledgment message sent to indicate that EPS 172 has received the instruction and will commence the detachment process in response to Detach Request Message 305. At this point, mobile device 104 drops from EPS 172.

Mobile device 104 sends Attachment Message 309 to EPS 172. Attachment Message 309 is a request from mobile device 104 to again attach to communication system 100, specifically to connect with EPS 172. By connecting with EPS 172, EPS 172 will become the home vehicle for mobile device 104, which means that HSS 122 is the home HSS for mobile device 104, and that all traffic will be routed to applications via network infrastructure located within EPS 172.

EPS 172 sends Attachment Response 310 to mobile device 104, which preferably confirms that the reattachment was successful and that mobile device 104 is now registered with EPS 172. Because of this, sidehaul 103 is no longer used to carry bearer or control traffic, and communications to and from mobile device 104 are more secure than prior to reattachment, when sidehaul 103 was used to carry data for mobile device 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
   connecting a mobile device to a first deployable in a multiple deployable ad hoc network;
   establishing a data session for the mobile device utilizing resources in the first deployable;
   handing over the mobile device to a second deployable in the multiple deployable ad hoc network, wherein the data session remains active;
   determining that the mobile device has entered an idle state;
   disconnecting the mobile device from the second deployable; and
   reconnecting the mobile device to the second deployable while maintaining the data session on the second deployable.

2. The method of claim 1, wherein the step of determining that the mobile device has entered an idle state comprises determining that only a default bearer is active for the mobile device.

3. The method of claim 1, wherein the step of determining that the mobile device has entered an idle state comprises determining that a number of dedicated bearers is below a predetermined threshold.

4. The method of claim 1, wherein the step of determining that the mobile device has entered an idle state comprises determining that a number of application sessions is below a predetermined threshold.

5. The method of claim 1, wherein the step of determining that the mobile device has entered an idle state comprises determining that a predetermined application is not currently being utilized.

6. The method of claim 1, wherein the step of determining that the mobile device has entered an idle state comprises determining that only Internet traffic is currently being utilized.

7. The method of claim 1, wherein the step of determining that the mobile device has entered an idle state comprises determining that a packets per second rate is below a predetermined threshold.

8. The method of claim 1, wherein the step of determining that the mobile device has entered an idle state comprises determining that a predetermined signal has been received from a user of the mobile device.

9. The method of claim 1, wherein the step of determining that the mobile device has entered an idle state comprises determining that a predetermined signal has been received from a second user.

10. The method of claim 1, wherein the step of determining that the mobile device has entered an idle state comprises determining that a predetermined signal has been received from a predetermined application on the mobile device.

11. The method of claim 1, wherein the step of determining that the mobile device has entered an idle state comprises determining that a predetermined signal has been received from an application on infrastructure equipment.

12. The method of claim 1, wherein the step of determining that the mobile device has entered an idle state comprises determining that a predetermined application is in use on the mobile device.

13. The method of claim 1, wherein the step of determining that the mobile device has entered an idle state comprises determining that the mobile device is only attached to a predetermined list of APNs.

14. The method of claim 1, wherein the step of determining that the mobile device has entered an idle state comprises determining that a packet per second rate for a dedicated bearer is below a predetermined threshold.

15. A method comprising:
connecting a mobile device to a first deployable in a multiple deployable ad hoc network, the mobile device affiliating with a first Home Subscriber Server (HSS) at the first deployable and routing data through a first packet gateway in the first deployable;
handing over the mobile device to a second deployable in the multiple deployable ad hoc network, the mobile device remaining affiliated with the first HSS and routing data through the first packet gateway;
determining that the mobile device has entered an idle state;
disconnecting the mobile device from the second deployable; and
reconnecting the mobile device to the second deployable, the mobile device affiliating with a second HSS at the second deployable and routing data through a second packet gateway in the second deployable.

16. A mobile device comprising a transceiver and a processor, wherein the transceiver and processor are configured to:
connect the mobile device to a first deployable in a multiple deployable ad hoc network;
establish a data session for the mobile device utilizing resources in the first deployable;
hand over the mobile device to a second deployable in the multiple deployable ad hoc network, wherein the data session remains active;
determine that the mobile device has entered an idle state;
disconnecting the mobile device from the second deployable; and
reconnecting the mobile device to the second deployable while maintaining the data session on the second deployable.

* * * * *